(12) United States Patent
Kim

(10) Patent No.: US 7,246,857 B2
(45) Date of Patent: Jul. 24, 2007

(54) SEAT FOLDING DEVICE OF VEHICLE

(75) Inventor: Sang Ho Kim, Incheon (KR)

(73) Assignee: Kia Motors Corporation, Seocho-Ku, Seoul (KR)

( * ) Notice: Subject to any disclaimer, the term of this patent is extended or adjusted under 35 U.S.C. 154(b) by 250 days.

(21) Appl. No.: 11/009,987

(22) Filed: Dec. 10, 2004

(65) Prior Publication Data
US 2005/0236879 A1    Oct. 27, 2005

(30) Foreign Application Priority Data
Apr. 26, 2004    (KR) ...................... 10-2004-0028587

(51) Int. Cl.
*B60N 2/02* (2006.01)
(52) U.S. Cl. ...................... 297/331; 297/336
(58) Field of Classification Search ................ 297/331, 297/332, 337, DIG. 10, 336; 296/65.01, 296/65.08, 65.05
See application file for complete search history.

(56) References Cited

U.S. PATENT DOCUMENTS

| | | | | |
|---|---|---|---|---|
| 702,234 A | * | 6/1902 | Morley | 297/332 |
| 2,153,155 A | * | 4/1939 | Page et al. | 297/342 |
| 4,008,919 A | * | 2/1977 | Muraishi | 297/331 |
| 4,475,769 A | * | 10/1984 | Crawford et al. | 297/331 |
| 4,838,612 A | * | 6/1989 | Cross | 297/338 |
| 4,852,849 A | * | 8/1989 | Jones | 248/575 |
| 5,082,327 A | * | 1/1992 | Crisp | 297/313 |
| 5,898,953 A | * | 5/1999 | Paxon | 4/248 |
| 5,934,732 A | * | 8/1999 | Jakubiec | 296/65.01 |
| 6,155,639 A | * | 12/2000 | Frolo | 297/331 |
| 6,805,407 B2 | * | 10/2004 | Iliscu | 297/331 |

FOREIGN PATENT DOCUMENTS

JP    2002-293178    10/2002

* cited by examiner

*Primary Examiner*—Joseph Edell
(74) *Attorney, Agent, or Firm*—Morgan Lewis & Bockius LLP

(57) ABSTRACT

The seat folding device of a vehicle includes a seat frame that linearly slides along an anteroposterior direction of the vehicle on a guide rail fixed to a floor panel of the vehicle. Two folding brackets are pivotally coupled at a front middle portion of the seat frame. A tilting bracket is coupled at the lower surface thereof to one end of the folding bracket by a hinge. A seat cushion is disposed at an upper side of the tilting bracket. The present invention thus constructed prevents deterioration of the appearance of the seat device and optimizes the stability of the vehicle, convenience of the user and marketability of the vehicle.

9 Claims, 3 Drawing Sheets

SEAT FOLDING DEVICE OF VEHICLE

CROSS-REFERENCE TO RELATED APPLICATIONS

The present application is based on, and claims priority from, Korean Application Number 10-2004-0028587, filed on Apr. 26, 2004, the disclosure of which is hereby incorporated by reference herein in its entirety.

FIELD OF THE INVENTION

The present invention relates to a seat folding device of a vehicle adapted to prevent deterioration of the appearance of the vehicle seat and to allow the seat to be smoothly folded within a narrow space.

BACKGROUND OF THE INVENTION

Generally, Recreational Vehicles (RV) are configured to embody various seat arrangements for improving the functionality of the vehicle. Therefore, certain vehicles are equipped with a device that properly folds the vehicle seat.

The seat folding device of a vehicle should be prevented from being exposed to the outside in order to preclude deterioration of the appearance of the vehicle seat. The folding operation should also be performed in a narrow space, and the folded state and original state of the vehicle seat should also be stabilized. Furthermore, the seat folding device should be easy in operation.

SUMMARY OF THE INVENTION

An embodiment of the present invention is provided to prevent a folding hinge of a seat cushion and a lower surface of the folded seat cushion from being exposed outside, thereby minimizing deterioration of the appearance of the vehicle seat. Furthermore, the seat cushion can smoothly fold within a narrow space, and the seat cushion tilts up and the safety device is released when the seat folds, contributing to an optimization of the stability and convenience of the user and marketability of the vehicle.

A seat folding device of a vehicle comprises a folding bracket pivotally coupled to a front portion of a seat frame of the vehicle. A tilting bracket is coupled at the lower surface thereof to one end of the folding bracket by a hinge. A seat cushion is disposed at an upper side of the tilting bracket. A tilt-up device is equipped at the folding bracket and tilting bracket. The tilt-up device resiliently tilts up the front side of the tilting bracket from the folding bracket according to a user's control.

BRIEF DESCRIPTION OF THE DRAWINGS

For a better understanding of the nature and objects of the present invention, reference should be made to the following detailed description with the accompanying drawings, in which.

DETAILED DESCRIPTION OF AN EMBODIMENT

Figure 1:
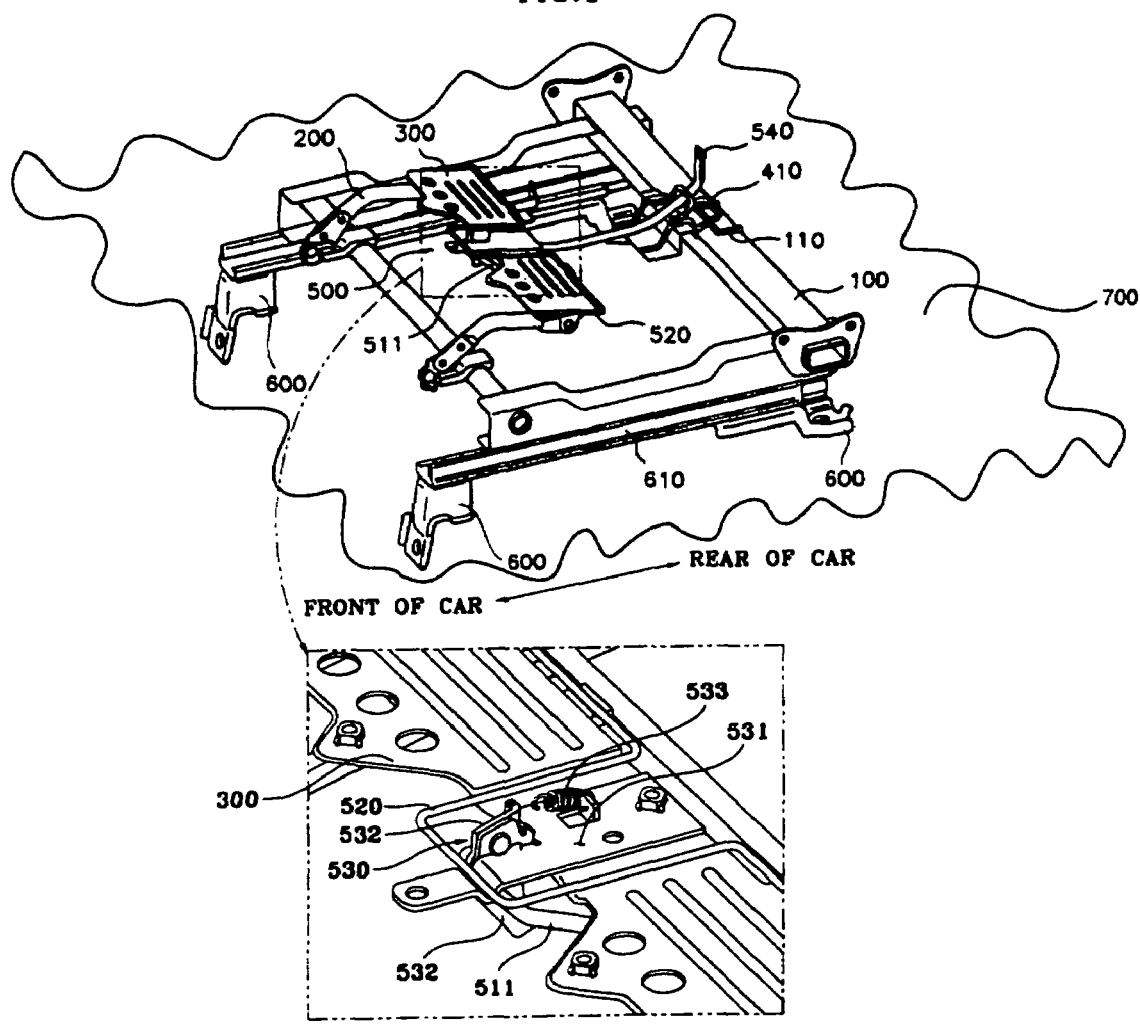
FIG. 1 is a perspective view of a seat folding device of a vehicle according to an embodiment of the present invention.

Referring to FIGS. 1 to 5, a seat folding device of a vehicle comprises a seat frame 100 that linearly slides along an anteroposterior direction of the vehicle on a guide rail 610 fixed to a floor panel 700 of the vehicle. Two folding brackets 200 are pivotally coupled to a front middle of the seat frame 100. A tilting bracket 300 is coupled at the lower surface thereof to one end of the folding bracket 200 by a hinge. A seat cushion 400 is disposed at an upper side of the tilting bracket 300. A plate panel 420 is fixed to a lower surface of the seat cushion 400. The plate panel 420 inwardly forms a space to the seat cushion 400 for enclosing the folding bracket 200 and tilting bracket 300. The plate panel 420 is also fixed to an upper surface of the tilting bracket 300.

Figure 3:
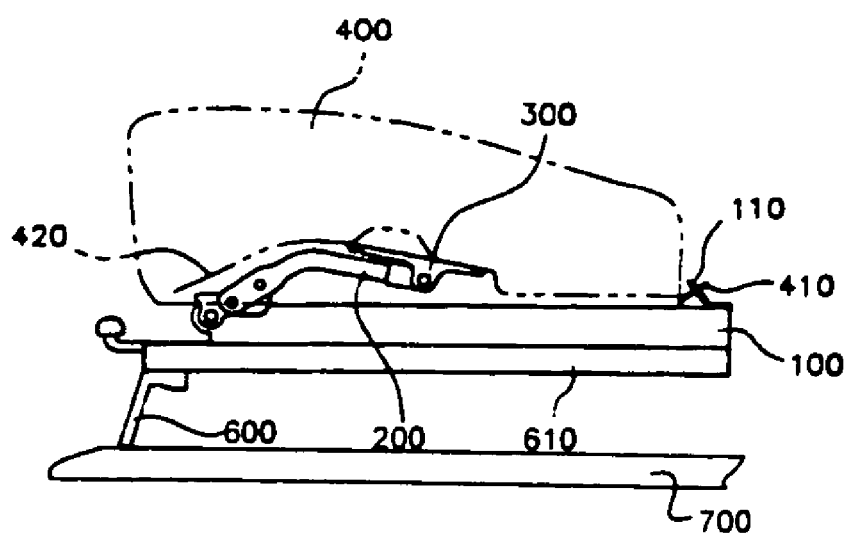
FIG. 3 is a side view in relation to a seat folding device of a vehicle under its normal state according to an embodiment of the present invention.

The guide rail 610 is secured to the floor panel 700 of the vehicle via a seat bracket 600. The folding bracket 200 is bent at the middle portion in order to form a predetermined angle. As illustrated in FIG. 3, the folding bracket 200 and tilting bracket 300 are located at a space provided by the plate panel 420 at a lower side of the seat cushion 400. The folding bracket 200 is pivotally supported at one end thereof to the seat frame 100. The other end of the folding bracket 200 connects to a lower surface of the tilting bracket 300 via a hinge.

Figure 4:
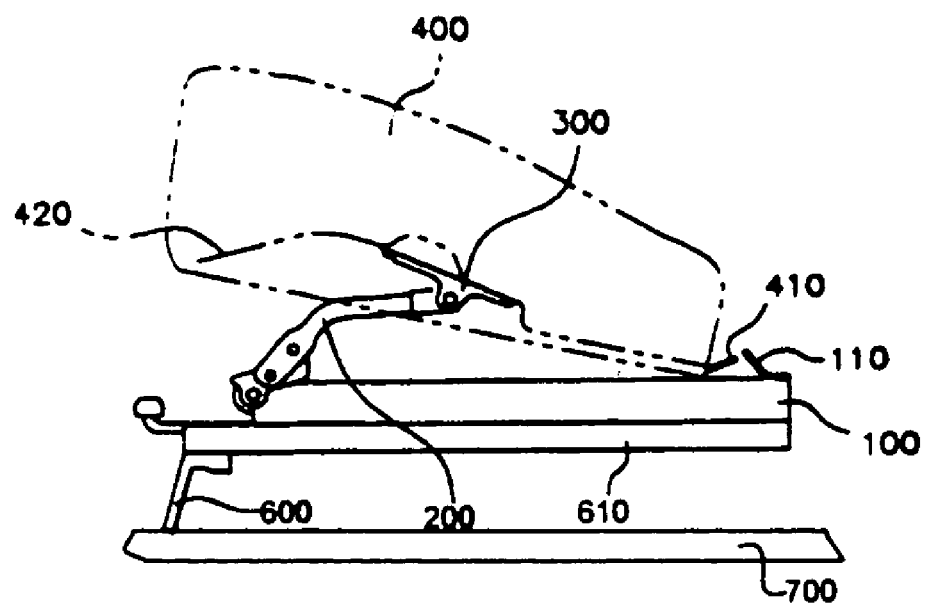
FIG. 4 is a side view of a tilted seat cushion in relation to a seat folding device of a vehicle at an initial folding state according to an embodiment of the present invention.
Figure 5:
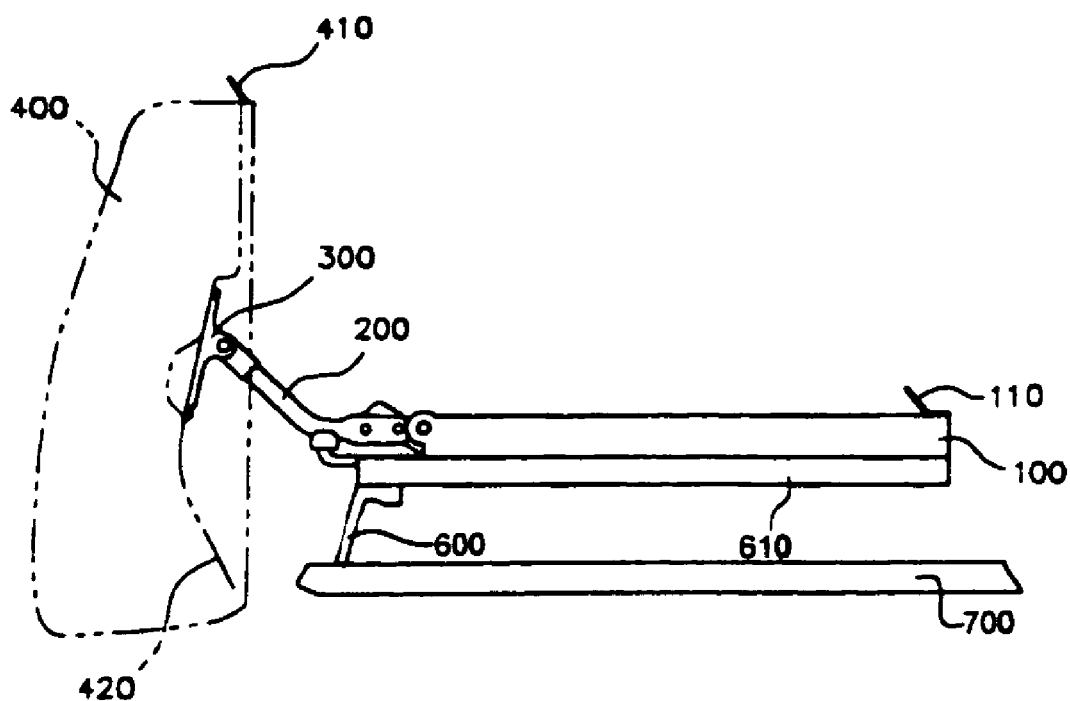
FIG. 5 is a side view illustrating a complete folded state in relation to a seat folding device of a vehicle according to an embodiment of the present invention.

The hinge between the folding bracket 200 and seat frame 100 is placed between the guide rail 610 and the lower surface of the seat cushion 400 to thereby prevent the hinge from being exposed outside. The tilting bracket 300 connecting to the folding bracket 200 can pivot from the folding bracket 200. As shown in FIGS. 3 to 5, the upper surface of the tilting bracket 300 is coupled to the plate panel 420 by a coupling means (not shown), e.g., a bolt, screw, or the like.

When observed from the front or rear of the seat, the folding bracket 200, tilting bracket 300 and the like are prevented from being exposed outside such that supplementary components for preventing exposure of the seat folding device are not required and the elegant appearance of the seat can be maintained. In order to assist female drivers or elders to facilitate the folding of the seat cushion 400, a tilt-up device 500 is further equipped at the folding bracket 200 and tilting bracket 300. The tilt-up device 500 resiliently tilts up the front side of the tilting bracket 300 from the folding bracket 200 at a predetermined angle according to the user's control. Various types of the tilt-up device 500 can be applied to the folding bracket 200 and tilting bracket 300 for upwardly tilting up the front side of the seat cushion 400 via the tilting bracket 300 by using the resilient force.

Figure 2:
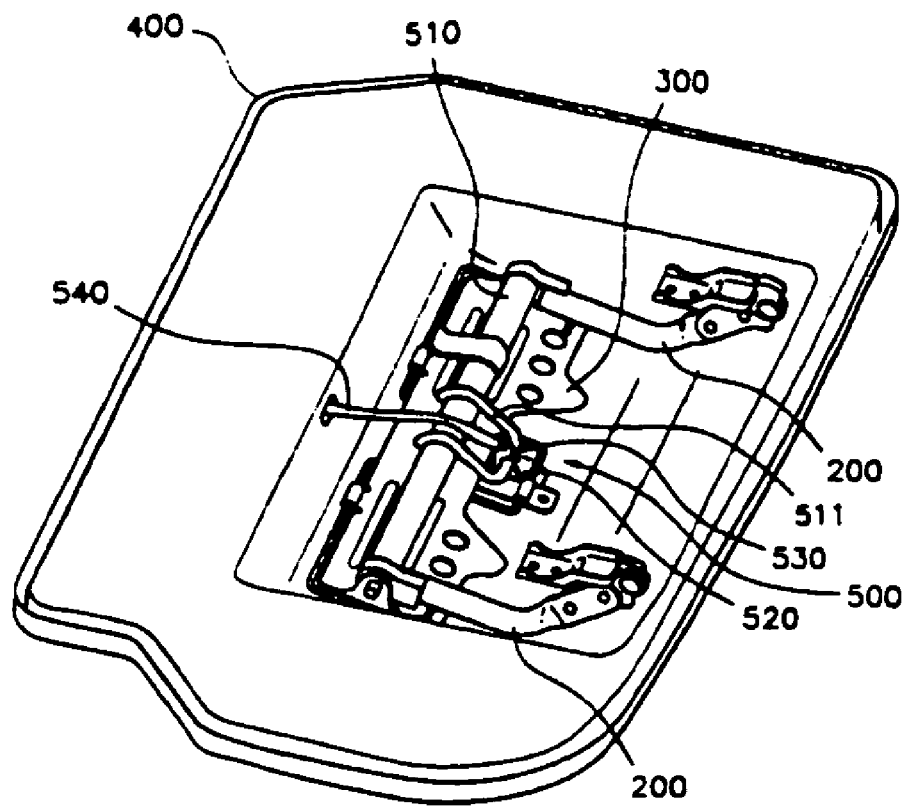
FIG. 2 is a perspective view of a seat folding device of a vehicle when observed from the bottom according to an embodiment of the present invention.

As illustrated in FIGS. 1 and 2, an embodiment in relation to the tilt-up device 500 comprises a tilting shaft 510 having a striker 511 at the middle portion thereof. The tilting shaft 510 connects two folding brackets 200. An elastic means 520 lifts up the front of the tilting bracket 300 from the folding bracket 200. A latch 530 is supported by the tilting bracket 300 and fixed to the striker 511. A folding band 540 connects at one end thereof to the latch 530. The other end of the folding band 540 is exposed to the outer side of the seat cushion 400.

That is, the tilting shaft 510 provided with the striker 511 connects the two folding brackets 200 and tilting bracket 300. The latch 530 is further provided at the tilting bracket 300 for maintaining a locked state by selectively coupling the latch 530 to the striker 511. When the user releases the latch 530 from the striker 511 by pulling the folding band 540 connected to the latch 530, the tilting bracket 300 and the front side of the seat cushion 400 tilt upwardly via the elastic means 520, thus facilitating the folding operation of the seat.

With reference to FIGS. 1 and 2, the elastic means 520 is arranged in a zigzag form between the tilting bracket 300 and the lower surface of the seat cushion 400. The elastic means 520 may be a torsion spring and the middle portion of the elastic means 520 is fixed to the tilting bracket 300 and the lower surface of the seat cushion 400. Both ends of the elastic means 520 connect to the folding bracket 200.

The latch 530 comprises a latch base 531 fixed to the tilting bracket 300. A latch arm 532 is pivotally fixed to the latch base 531. An spring 533 supports the latch arm 532 to pivot the latch arm 532 toward the striker 511.

By way of reference, FIG. 1 illustrates a state that the spring 533 is separated from the latch arm 532. When the seat cushion 400 is horizontally placed to allow the passenger to sit thereon and the latch 530 is locked with the striker 511, then the elastic means 520 maintains a maximum resilient transformation. On the other hand, if the latch 530 is released from the striker 511 by pulling the folding band 540, the front of the tilting bracket 300, i.e., the front side of the seat cushion 400 tilts up as shown in FIG. 4 via the resilient restoring force of the transformed elastic means 520.

As shown in FIGS. 1, 3, 4, and 5, a fixing loop 110 may be upwardly installed on the rear of the seat frame 100. A locking loop 410 is slopingly formed to penetrate the fixing loop 110 and may be equipped at the rear end of the seat cushion 400. Thus, if the seat cushion 400 is horizontally placed under a normal state, the rear portion of the seat cushion 400 is prevented from being forwardly overturned during a sudden stop or a vehicular collision.

The operation of the seat folding device of a vehicle will now be described in detail under a normal state, initial tilting state, and complete folding state. Under the normal state, as illustrated in FIGS. 1 to 3, when the seat cushion 400 is horizontally placed for allowing the passenger to be seated thereon, the latch 530 is in an engaged state with the striker 511, and the elastic means 520 maintains a maximally transformed state.

Provided that the user pulls the folding band 540 to fold the seat in an initial tilting state, the latch 530 engaging with the striker 511 is released and the transformed elastic means 520 is elastically restored to its original state. Therefore, the front portion of the tilting bracket 300 and seat cushion 400 tilt up from the folding bracket 200 as depicted in FIG. 4. The locking loop 410 installed at the rear end of the seat cushion 400 is separated from the fixing loop 110 fixed on the seat frame 100 by welding or the like.

Next, as shown in FIG. 5, the user pivots the folding bracket 200 in a counterclockwise direction by continuously pulling the folding band 540. The seat folding procedure is then completed by raising the seat cushion 400 of the second row vertically toward the rear of the seat of the first row. Accordingly, the seat folding device of a vehicle according to the embodiment of the present invention can smoothly fold the seat cushion 400 within a narrow space when folding the seat cushion 400 and further prevent the deterioration of the seat's appearance. Female drivers or elders can easily fold the seat cushion 400. Moreover, when the seat cushion 400 is not folded, the locking loop 410 is positioned in the fixing loop 110 for preventing the seat cushion 400 from overturning, increasing the convenience and stability of the user.

As apparent from the foregoing, there is an advantage in that the seat folding hinge and the lower surface of the folded seat cushion are prevented from being exposed to outside, thereby preventing deterioration of the appearance of the vehicular seat. Furthermore, the seat can be smoothly folded within a narrow space and the safety device is released when the seat cushion tilts up, optimizing the stability of the vehicle, convenience of the user and marketability of the vehicle.

What is claimed is:

1. A seat folding device of a vehicle, the device comprising:
   two folding brackets pivotally coupled to a front portion of a seat frame of the vehicle;
   a tilting bracket coupled at the lower surface thereof to one end of each of said folding brackets by a hinge;
   a seat cushion disposed at an upper side of said tilting bracket; and
   a tilt-up device provided at said folding brackets and said tilting bracket, wherein said tilt-up device resiliently tilts up the front of said tilting bracket from said folding brackets according to a user's control, said tilt-up device comprising:
      a tilting shaft having a striker at a middle portion thereof and connecting the folding brackets;
      elastic means lifting up the front of said tilting bracket from said folding brackets; and
      a latch connecting to said tilting bracket and fixed to said striker.

2. The device as defined in claim 1, wherein said seat frame linearly slides along an anteroposterior direction of the vehicle on a guide rail fixed to a floor panel.

3. The device as defined in claim 2, wherein a hinge between said folding brackets and said seat frame is placed between said guide rail and the lower surface of said seat cushion.

4. The device as defined in claim 1, wherein a plate panel is further fixed to a lower surface of said seat cushion, said plate panel inwardly forms a space below said seat cushion for enclosing said folding brackets and said tilting bracket, and said plate panel is also fixed to an upper surface of said tilting bracket.

5. The device as defined in claim 1, wherein said tilt-up device further comprises:
   a folding band connecting at one end thereof to said latch, wherein the other end of said folding band is exposed to the an outer side of said seat cushion.

6. The device as defined in claim 1, wherein said resilient means comprises a torsion spring arranged in a zigzag form between said tilting bracket and the lower surface of said seat cushion.

7. The device as defined in claim 6, wherein said torsion spring is fixed at the middle portion thereof to said tilting bracket and the lower surface of said seat cushion, wherein both ends of said torsion spring connect to said folding brackets.

8. The device as defined in claim 1, wherein said latch includes:
   a latch base fixed to said tilting bracket;
   a latch arm pivotally fixed to said latch base; and
   a spring supporting said latch arm to pivot said latch arm toward said striker.

9. The device as defined in claim 1, wherein a fixing loop is further upwardly equipped on the rear portion of said seat frame; and a locking loop is installed to hook by penetrating said fixing loop at the rear end of said seat cushion.

* * * * *